Oct. 1, 1957      P. M. LARGE      2,808,502
AUXILIARY AUTOMOBILE LIGHTING DEVICE
Filed June 9, 1955
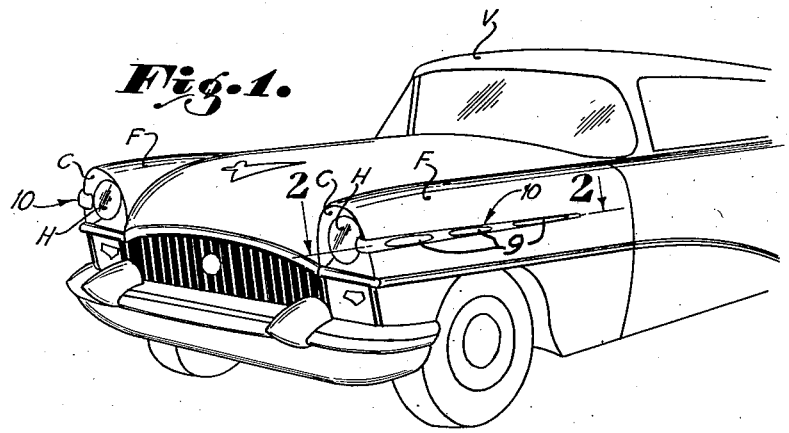
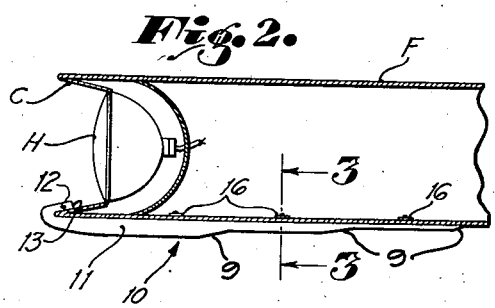
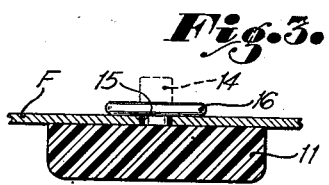
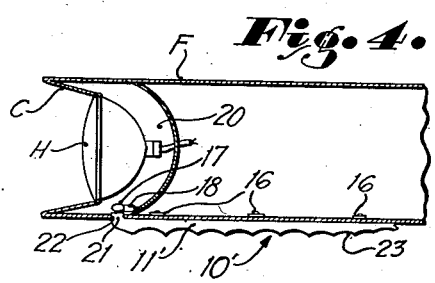
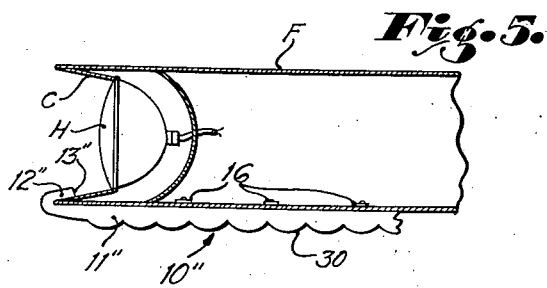
PHILLIP M. LARGE,
INVENTOR.
BY
AGENT.

United States Patent Office 2,808,502
Patented Oct. 1, 1957

2,808,502
AUXILIARY AUTOMOBILE LIGHTING DEVICE

Phillip M. Large, Los Angeles, Calif.

Application June 9, 1955, Serial No. 514,293

1 Claim. (Cl. 240—8.2)

This invention relates generally to a supplemental lighting device for vehicles and relates more specifically to a new type of running or parking light, utilizing light transmitting properties of translucent plastics or the like.

Contemporary automobile design tends toward considerable ornamentation including various types of covers, rings, and plated devices which surround the peripheries of end and tail lights, thus to obscure such lights from observers at the sides of the automobile. In certain weather conditions and particularly in rain, fog, snow and the like, where vision is often obscured, the normal headlight beams from automobiles is often not readily seen, thus to create a dangerous situation for not only the driver of such vehicles but also the drivers of other vehicles approaching at right angles thereto.

In order that this problem may be solved, it is the natural tendency to follow prior art teachings and to place a lighting device along one side or the other of the vehicles whose headlights are obscured by ornamental rings and the like. However, such additional lights are often not attractive nor do they blend with contemporary automobile design and manufacturers of these automobiles have avoided such additional lighting equipment in an effort to provide the desired ornamental designs for their products.

It is accordingly one important object of the present invention to provide a supplemental lighting device for vehicles wherein lighting visible from the side aspect of such vehicles is operatively combined with other design trim thereon.

It is another important object of the present invention to provide a novel supplemental lighting device for vehicles wherein the source of light of such device is derived from other lighting equipment carried by the vehicle.

It is a further important object of the present invention to provide a novel ornamental trim structure constructed from a translucent plastic and provided with a source of illumination therefor.

It is still another important object of the present invention to provide a novel supplemental lighting device for the side aspects of vehicles wherein a translucent plastic strip is utilized to provide a plurality of softly illuminated light facets along sides of the vehicle.

Other and further important objects of the present invention will become apparent from the disclosures in the following detail specification, appended claims and accompanying drawing, wherein:

Figure 1 is a fragmentary perspective view illustrating the forward three-quarter aspect of a typical contemporary vehicle showing the supplemental lighting device of the present invention incorporated therewith;

Fig. 2 is an enlarged fragmentary sectional view through the left front fender of the present vehicle including the supplemental lighting device of the present invention as taken substantially as indicated by line 2—2, Fig. 1;

Fig. 3 is an enlarged fragmentary sectional view showing the method of attachment for the supplemental lighting device of the present invention to a body element of a vehicle as taken substantially as indicated by line 3—3, Fig. 2;

Fig. 4 is a sectional view similar to Fig. 2, showing a modified method of illuminating the supplemental lighting device of the present invention; and Fig. 5 is a sectional view similar to Figs. 2 and 4 showing a further modification of the present invention.

With reference to the drawing wherein like characters denote like parts, a supplemental lighting device of the present invention is shown in Fig. 1 as indicated generally at 10. As shown, the lighting device 10 is associated with each of the flat fenders F of a typical contemporary vehicle indicated generally at V. In accordance with contemporary practice, the headlights H of the vehicle are provided with ornamental cover portions C that extend forwardly over the forward face of the headlights H, thus to obscure such headlights from side vision. Accordingly, it is the intention of the device of the present invention to provide means for correcting this situation created by the beforementioned contemporary design trends.

With reference primarily to Fig. 2, the auxiliary lighting device of the present invention, as indicated at 10 includes a body portion 11 that is made from suitable translucent plastic such as, for example, "Lucite" or the like. The properties of this particular type of plastic material are such as to accept light only through surfaces that are disposed normal to the general grain in the material. As a general rule, such grain runs longitudinally of the material. In the present invention, it is to be noted that the body portion 11 has a tip portion 12 that is bent substantially back over the body portion 11 and directed toward the vehicle headlight H. In other words, the tip portion 12 has an end surface 13 that acts as a light gathering surface for transmitting the light about the bent back portion into the body 11 of the device 10. It is to be noted that the device 10 extends along the fenders F in a manner to simulate an ordinary and distinctive trim element on the vehicle and the exterior surface of the device 10 may be plated with any suitable plating material in order that its appearance may resemble other trim elements on the vehicle.

As shown primarily in Figs. 2 and 3, it is to be noted that the body 11 of the device 10 may be secured to the fender as by any suitable means, such as for example, the extension of a tubular plastic portion shown at 14 by the dotted lines in Fig. 3 through an opening 15 in the fender F and deforming this protruding portion 14 as by heating such portion into a flat disc as shown at 16.

In order that the light transmitted to a body 11 of the device 10 may be seen from the exterior surface of the device and along various portions of the fender F, a body 11 is provided with a plurality of facets 9 that are established by cutting the plastic material across the grain thereof, thereby permitting transmission of light thereto. Obviously, if the device 10 is plated as described hereinbefore, the plating would be left from the facets 9 in order that light may be transmitted therefrom. In the event no plating is placed upon the surface of the device 10, a slight glow will be experienced throughout the length thereof with greater areas of intense light being presented in the regions of the facets 9.

As shown in Fig. 4, the device of the present invention may not only be as described hereinbefore, but may assume other configurations to provide for ornamental and functional necessities. Additionally, it is to be noted that the device shown at 10' may be provided with illumination from a separate source such as, for example, a bulb 17 contained within a socket 18 disposed within the usual chamber 20 rearwardly of the headlight mechanism H. In this particular instance, an end portion 21 of the supplemental lighting device 10' is positioned through an opening 22 in the outer wall of the fender F and adjacent the supplemental light source from the bulb 17. As shown, the device 10 further includes a plurality of convex convolutions 23 throughout the length thereof which provide varying light transmission and accordingly a row of ornamentally appearing lighted beads or the like.

With reference to Fig. 5, wherein like parts are indicated by double primed reference numerals, it may be seen that the present device may assume other physical shapes as for example, with a plurality of convex convolutions as at 30, thus to provide the necessary facets along the body portion 11''. In this form of the invention, a different form of light bead will be demonstrated along the surface of the device 10''.

It may thus be seen that the device of the present invention may assume various physical configurations, may receive its light from readily available source normally carried by the vehicle or may be illuminated from a separate light source without departing from the spirit and scope hereof.

It is further to be seen that the device of the present invention may or may not be plated or otherwise painted or coated, as may be required and desirable, in particular installational situations. If desired, the various facets of the bodies of the device may be etched, sandblasted or otherwise roughened to produce the desired end pattern and permit transmission of light therefrom.

Having thus described the invention and the present embodiments thereof, it is desired to emphasize the fact that many modifications may be resorted to in a manner limited only by a just interpretation of the following claim.

I claim:

A lighting device for providing supplemental illumination along each front fender of an automotive vehicle comprising, in combination: a unitary elongated body of translucent material, said body having an inner longitudinal surface contoured to engage a lateral side of said fender and lie flat thereon; a tip forming an integral portion on one end of said body, said tip portion being disposed to overlie an end portion of said body and arranged at an acute angle relative thereto, an ornamental cover portion of said fender surrounding headlights of said vehicle being adapted for reception between said inner surface of said body and said tip; a flat end surface on said tip, said end surface being disposed substantially parallel and in spaced relationship to said headlight whereby to receive illumination therefrom for transmittal along the length of said body; a plurality of stepped portions spaced longitudinally along said body remote from said inner surface thereof, said stepped portions defining elliptically shaped facets; a coating of opaque material on selected areas of said body and said tip, material of said body being exposed at said facets and said end surface; and a plurality of tubular portions disposed integrally from said inner surface and adapted for disposition through openings in said fender and for deformation thereafter to secure said body to said fender.

References Cited in the file of this patent

UNITED STATES PATENTS

| | | |
|---|---|---|
| 2,083,673 | Shenehon | June 15, 1937 |
| 2,165,899 | Matson | July 11, 1939 |
| 2,308,844 | Wilshusen | Jan. 19, 1943 |
| 2,623,313 | Fuchs | Dec. 30, 1952 |
| 2,635,179 | Bowman | Apr. 14, 1953 |
| 2,710,333 | Yates | June 7, 1955 |